Figure 1:
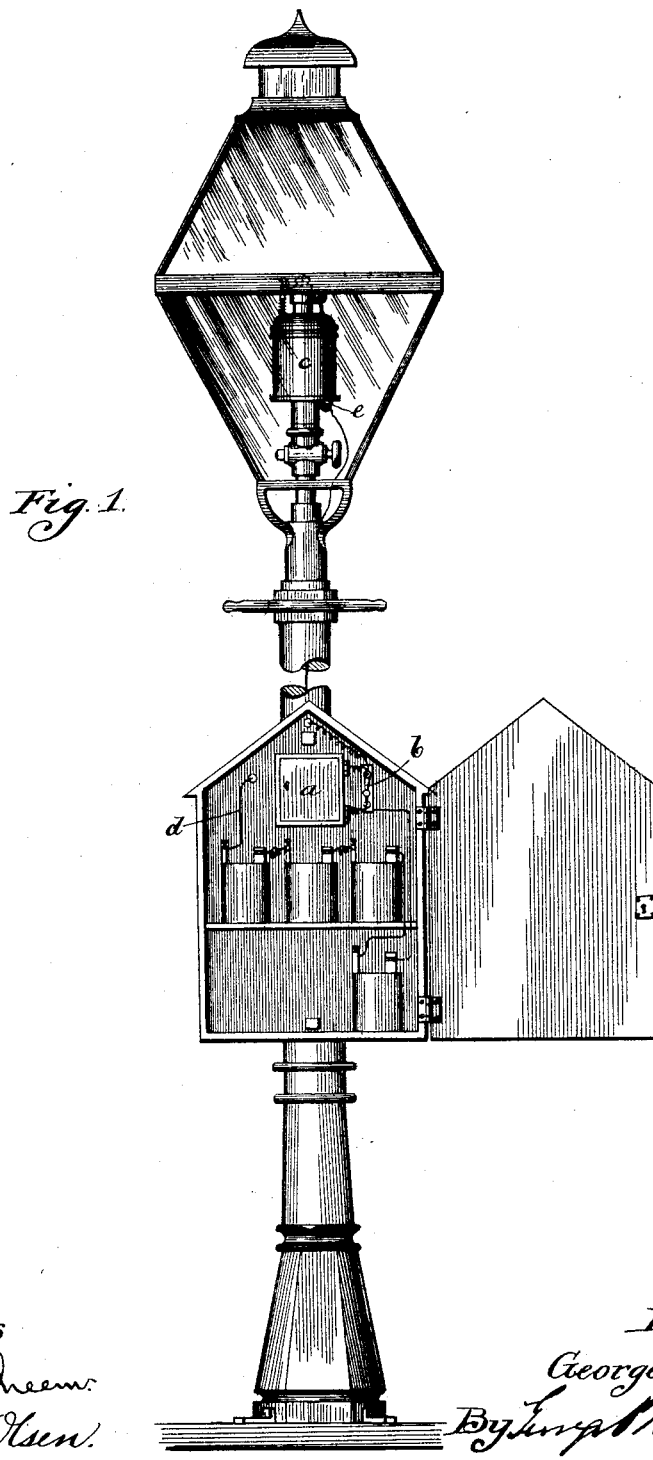

(No Model.) 5 Sheets—Sheet 1.
G. D. CLARKE.
AUTOMATIC GAS LIGHTING APPARATUS.

No. 458,154. Patented Aug. 25, 1891.

Witnesses
Wm M. Rheem
Martin H. Olsen

Inventor
George D. Clarke.
By [signature] Atty.

(No Model.)   5 Sheets—Sheet 2.
G. D. CLARKE.
AUTOMATIC GAS LIGHTING APPARATUS.
No. 458,154.  Patented Aug. 25, 1891.
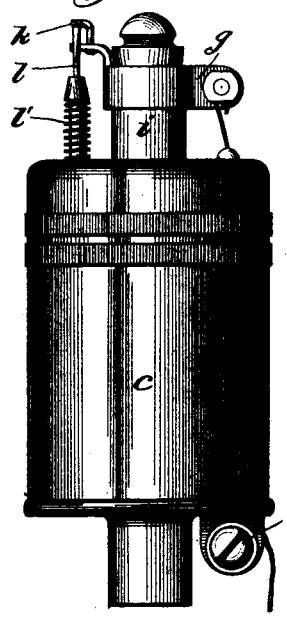
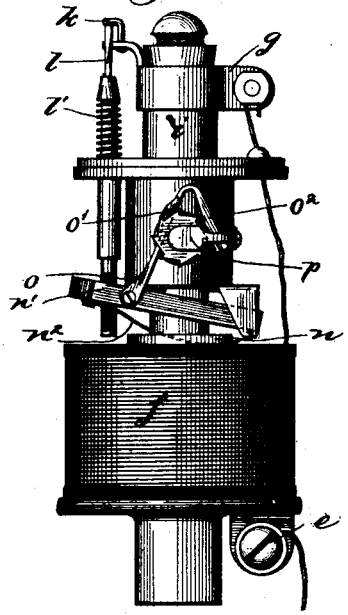
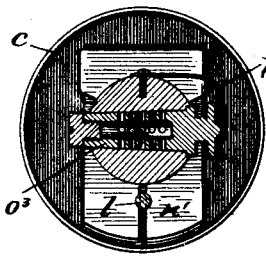
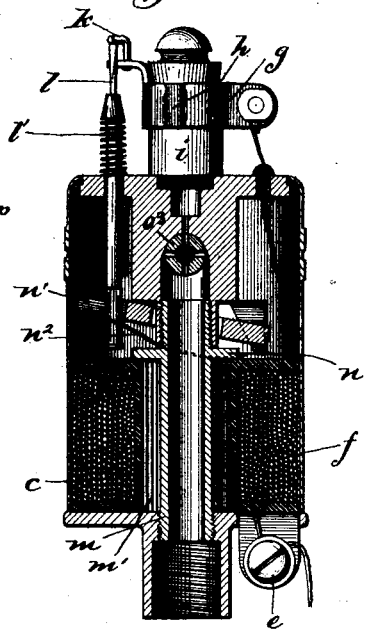
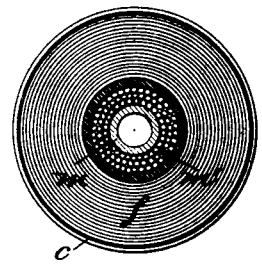
Witnesses
Wm. M. Rheem
Martin H. Olsen
Inventor
George D. Clarke.
By Geo. P. Barton
Atty (No Model.) 5 Sheets—Sheet 3.

G. D. CLARKE.
AUTOMATIC GAS LIGHTING APPARATUS.

No. 458,154. Patented Aug. 25, 1891.

Witnesses
Wm. M. Rheem.
Martin H. Olsen

Inventor
George D. Clarke
By George P. Barton
Atty.

(No Model.) 5 Sheets—Sheet 4.
G. D. CLARKE.
AUTOMATIC GAS LIGHTING APPARATUS.
No. 458,154. Patented Aug. 25, 1891.
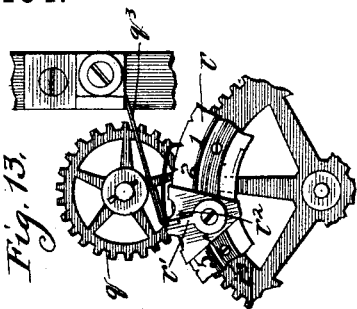
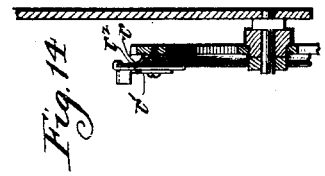
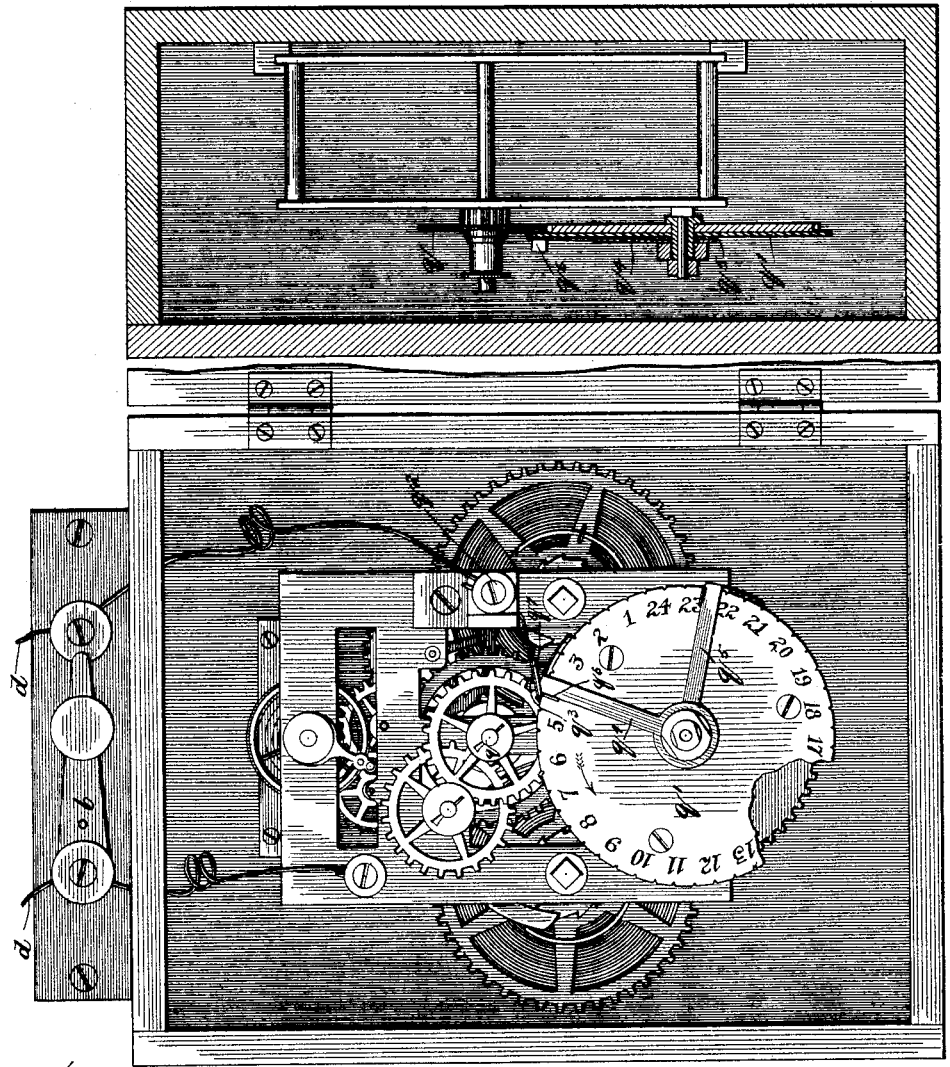
Witnesses
Wm. M. Rheem
Martin H. Olsen
Inventor
George D. Clarke.
By George F. Barton
Atty.

(No Model.)  5 Sheets—Sheet 5.

G. D. CLARKE.
AUTOMATIC GAS LIGHTING APPARATUS.

No. 458,154. Patented Aug. 25, 1891.

Witnesses
George L. Cragg
Martin H. Olsen.

Inventor
George D. Clarke
By George H. Borton
Atty.

UNITED STATES PATENT OFFICE.

GEORGE D. CLARKE, OF CHICAGO, ILLINOIS, ASSIGNOR OF FIVE-EIGHTHS TO WILSON S. CHAPMAN, OF SAME PLACE.

AUTOMATIC GAS-LIGHTING APPARATUS.

SPECIFICATION forming part of Letters Patent No. 458,154, dated August 25, 1891.

Application filed December 30, 1890. Serial No. 376,234. (No model.)

*To all whom it may concern:*

Be it known that I, GEORGE D. CLARKE, a citizen of the United States, residing at Chicago, in the county of Cook and State of Illinois, have invented a certain new and useful Improvement in Automatic Electric Gas-Lighting Apparatus, of which the following is a full, clear, concise, and exact description, reference being had to the accompanying drawings, forming a part of this specification.

The object of my invention is to provide means whereby gas may be lighted and extinguished at such times as may be desired during the twenty-four hours; and it consists in clock-work used in connection with suitable electrical apparatus and so arranged that as long as the clock continues to run the gas will be lighted at a certain predetermined hour and extinguished at another hour. Thus, for example, the clock may be wound up and the circuit-closing arms set so that at five o'clock p. m. the circuit will be closed and an electro-magnet or other suitable electric motor brought into action to open the gas-valve, and immediately thereafter and for a suitable space of time—as, for example, a minute and a half—electric sparks will be made as the current is interrupted at contacts against which the gas is thrown. The valve is turned when the circuit is first closed, and thereafter during the time the spark is being made the valve is held in position and prevented from being turned. The gas having been lighted continues to burn, we will say, till six o'clock in the morning, or until a second circuit-closing arm carried by the clock-work again closes the circuit, thus bringing the electric motor or magnet again into action to close the valve and thus extinguish the light. The clock may be constructed to run for eight days, and thus by simply winding the clock once a week the gas will be lighted and extinguished without further interference. Any well-known means of producing the electric current may be employed. I preferably use, however, what is known in the art as a "dry" battery.

Among the special features of my invention I would mention, first, an electro-magnet having its armature connected with a ratchet-wheel for rotating the same to turn on and off the gas, the core of said electro-magnet being formed of small rods, so that the electro-magnet may be utilized as a spark-coil; second, the armature of the electro-magnet provided with a central opening through which passes the gas-pipe, the retractile spring of said armature being attached to the under side of the free end thereof, the curved or lower beveled end of said spring bearing upon the upper end of the magnet-spool, said armature centrally at its free end being provided with a slot and the spindle of the sparking-electrodes placed in said slot and operated by the movement of the armature as the current is broken intermittently; third, the gas-valve provided with a ratchet-wheel and a pawl connected with the armature for rotating the same, said pawl being extended so as to come against the shaft of the valve to limit the movement thereof; fourth, a retaining-spring resting upon the hub of the ratchet-wheel of the valve and the pawl carried by the armature and adapted to be disengaged from the ratchet-wheel and shaft of the valve, so that the valve may be readily removed as occasion requires; fifth, the armature provided with the pawl for operating the ratchet-wheel of the valve and the movable contact of the spark-electrodes, whereby on closing the circuit the valve is rotated a predetermined distance, and thereafter until the circuit is interrupted the said lower contact is caused to vibrate to produce a spark at the burner; sixth, a street-lamp with electrical apparatus controlled by clock-work for lighting and extinguishing the same, the battery and clock-work being inclosed in a box secured to the lamp-post and the circuit extending to and including the electro-magnetic spark-coil below the gas-tip; seventh, the clock for automatically closing the circuit at stated intervals, combined with the motor in the form of a spark-coil at the gas-tip, and a special switch, whereby the gas may be lighted or extinguished by closing the circuit independent of the movement of the clock; eighth, a dial driven by clock-work and provided with two or more adjustable circuit-closing devices, in combination with an electric circuit extending to the motor controlling the gas-valve and the vibrating sparking contacts operated after the valve has been opened to insure the lighting of the gas; ninth, an electro-magnet having an annular chamber within the coil, this chamber being provided with annealed or soft-iron rods to form the core or a portion thereof, whereby the electro-magnet is made more efficient and adapted to serve also as a spark-coil; tenth, the spark electrode, combined with the armature to cause the electrode to vibrate while the armature holds its opposing spring compressed, and, eleventh, I have devised a special hand-switch for shunting the clock and lighting or extinguishing the gas independent thereof.

Figure 7:
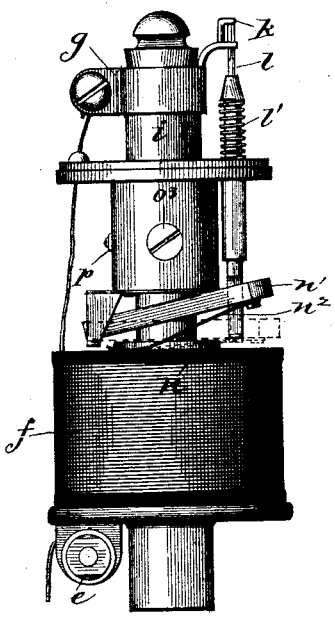
Figure 8:
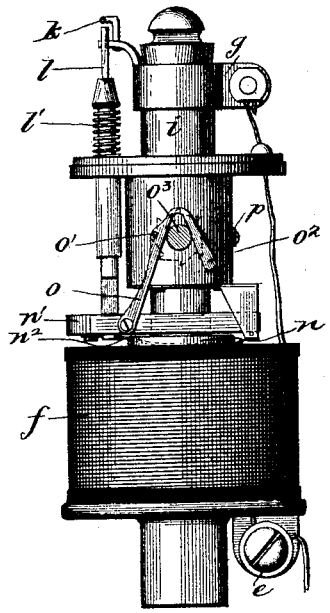
Figure 9:
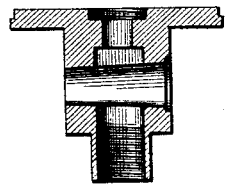
Figure 10:
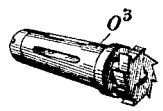
Figure 15:
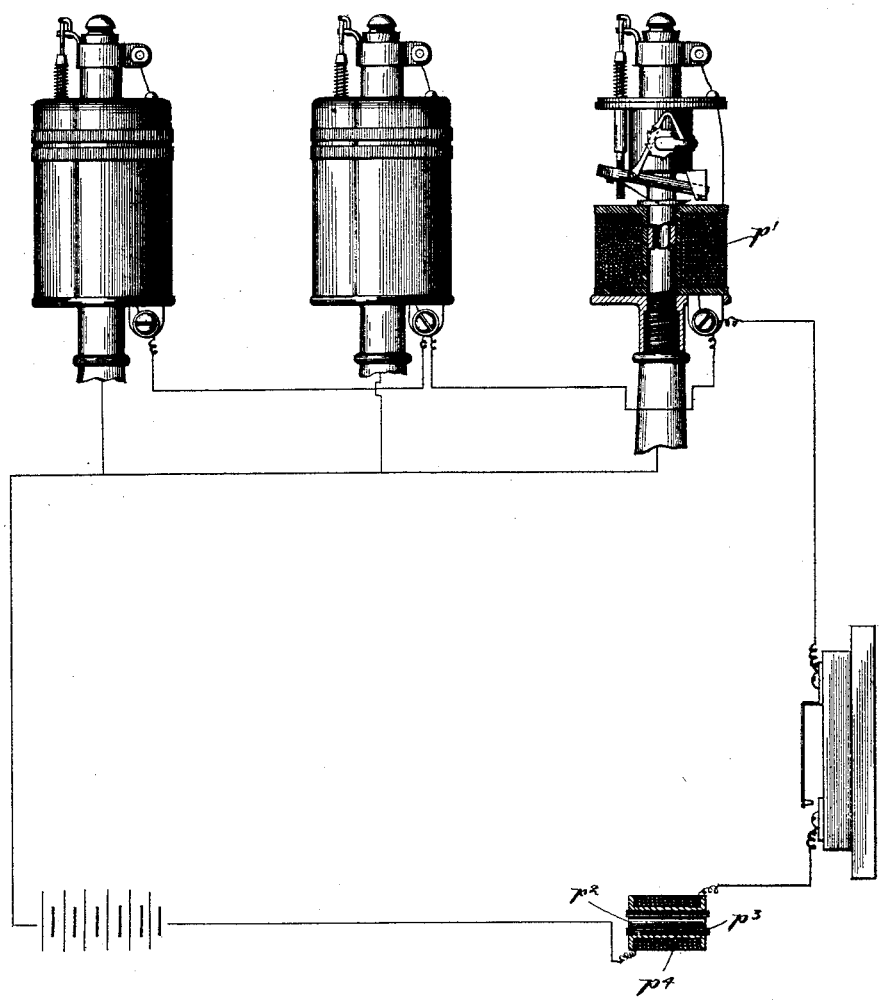
Figure 16:
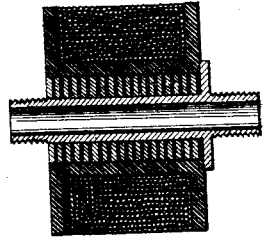

In the drawings, which are illustrative of my invention, Figure 1 is a front elevation showing a street-lamp provided with my invention, the box containing the clock, hand-switch and battery being bolted to the post, and the electro-magnet for controlling the valve and forming the spark being placed below the gas-tip. Fig. 2 is an elevation of the gas-tip with the case surrounding the electro-magnet. Fig. 3 is a front elevation thereof with the case removed. Fig. 4 is a vertical longitudinal sectional view through the electro-magnet and valve. Fig. 5 is a horizontal section through the gas-valve. Fig. 6 is a horizontal section through the spark-coil. Fig. 7 is a view of the rear side of the electro-magnet and spark-contacts, showing the position of the retractile spring of the armature. Fig. 8 is a front elevation showing the armature depressed, the pawl in engagement with a notch of the ratchet-wheel, and the extended beak or hook of the pawl against the shaft of the valve to limit the rotary movement thereof. Fig. 9 is a detailed sectional view showing the seat of the gas-valve. Fig. 10 is a perspective view of the valve. Fig. 11 is a front elevation of the clock-movement with the dial and adjustable contact-arms for controlling the circuit. Fig. 12 is a sectional view showing the construction of the dial and adjustable contact-arms and the pinion for rotating the said dial. Fig. 13 is a front elevation of a modified form of dial and adjustable contact-closing devices. Fig. 14 is a sectional view showing the manner in which the contact devices of Fig. 13 are mounted upon the dial. Fig. 15 shows the magnet with a solid core and special spark-coil. Fig. 16 is a modification of the core.

Like parts are indicated by similar letters of reference throughout the different figures.

Referring now to Fig. 1, the battery is shown placed in a suitable box which is mounted on the lamp-post, room being left for extra battery whenever required. The clock-work may be inclosed in a small case $a$, placed within the battery-box. The hand-switch $b$ is placed in convenient position and serves as a means of closing the circuit, to turn on or off the gas at any time that may be desired, without waiting for the action of the clock. The electro-magnet and spark-coil and the valve and ratchet for operating the same are placed at the gas-tip and are provided with a suitable covering $c$. The circuit may be traced from the ground by wire $d$, through the battery, and thence through the clock-work, (for detail see Fig. 11,) and thence to the binding-post $e$, leading to the coil $f$ of the electro-magnet, (for detail see Fig. 4,) thence to clamp $g$, which is insulated by paper $h$, or otherwise, from the tube $i$, said clamp $g$ being provided with a curved arm or projection of platina $k$ of the spark-creating contacts. The circuit may be traced thence to the spindle or movable contact $l$ and thence to the gas-pipe, thus completing the circuit to the ground.

I will now describe somewhat in detail the electro-magnet and spark-coil $f$, the armature, the pawl, the ratchet-wheel, the gas-valve and spindle or movable contact $l$, and their relation to one another. The core of the magnet consists of a bar of soft iron $m$, having a small opening lengthwise through its center to permit the egress of gas, and is provided with an inner annular space or chamber, into which annealed—that is, soft—iron rods or pins $m'$ are inserted. The bobbin of insulating material surrounds the core, and is provided with a suitable number of turns of wire of suitable gage, length, and test to secure the greatest efficiency. It is by the insertion of soft-iron rods $m'$ into the annular chamber of the core of the electro-magnet $f$ that I secure my combination of an electro-magnet and spark-coil. The pole $n$ of the electro-magnet is placed below the armature $n'$, which is suspended at one end by trunnions or pivots so as to overhang the head or pole $n$ of the magnet. This armature has a central opening for the passage of the gas-pipe, and another in its free end to permit liberty of movement thereof up and down the spindle $l$. To its under side is fastened a retractile vibratory spring $n^2$, the office of which is to hold the armature $n'$ normally at its free end elevated at an angle of about twenty degrees above the restrained end and away from the pole $n$ of the magnet. The retractile vibratory spring $n^2$ performs two distinct functions, the first being to restore the armature to its normal position while the circuit is open, and the second being to secure conjunctively with the spiral spring on the spindle, with whose tension it is carefully adjusted, unfailing and perfect contacts at the electrodes while the circuit is closed and at the same time amplifying the vibrations of the armature. It should be noted that the impulse imparted to the armature by the peculiar combination of magnetic and dynamic force and action of the electro-magnetic spark-coil makes it important that the said springs should co-operate in their action, as above set forth. The free end of this spring $n^2$ is preferably curved at the outer end, as shown, so that it may work or slide over its bearing-surface without undue friction. The pawl $o$, which is fastened to the armature, is provided with a pin $o'$, adapted to strike and engage a tooth of the ratchet, and has also a beak or extension $o^2$ for limiting the movement of the ratchet and valve. The valve $o^3$ is provided with a ratchet having, preferably, eight teeth, and has four holes or openings to correspond, so that by turning the valve $o^3$ one step the conditions will be changed—that is, if open, by rotating the valve one step it will be closed, likewise, if closed, the turning of the valve one step will open it; or, to state it another way, as the pawl $o$ acts upon the ratchet-wheel the valve $o^3$ is alternately opened and closed. I find it necessary, therefore, to confine the movement of the valve $o^3$ to a single step at each closing of the circuit. Hence I invented the particular form of pawl shown, so that when the armature $n'$ is attracted, as shown in Fig. 8 and as indicated by dotted lines in Fig. 7, this beak or extension $o^2$ will drop over the shaft of the valve $o^3$, locking and limiting the stroke of the pawl $o$, and hence confine the rotation of the valve $o$ to one step at a time. This valve $o^3$, as shown in Figs. 5 and 10, is slightly tapered and provided with a shoulder on the larger end to secure a tight joint and prevent leakage of gas. It is held in position in the valve-seat by a pivoted restraining-spring $p$ (see Figs. 3 and 5) to facilitate the removal of the valve from its seat when necessary. The spindle or movable contact $l$ is provided with a spiral spring $l'$, one end of which rests on the flange of the valve-seat, the other against a shoulder at the upper end of said spindle $l$. The office of spring $l'$ is to hold the platina apex of the spindle $l$ in contact with arm $k$. At its lower end the spindle $l$ is provided with shoulders, against which the armature $n'$ comes in contact when attracted by the magnet, thereby intermittently breaking the circuit. Binding-post $e$ is of novel construction, being a sheared segment of the metallic base of the electro-magnet, provided with a screw and washers insulated and adapted to receive the wires from the electro-magnet and battery.

I will now describe the peculiar electrical action of the electro-magnet and spark-coil combination. The armature $n'$ performs two distinct functions: First, when the current is sent through the electro-magnet $f$ the armature $n'$ is attracted, and, by means of the pawl $o$ and the ratchet-wheel device, serves to rotate the gas-valve a single step to either open or close the valve, as the case may be, and, second, after the valve has been opened to permit the egress of gas the free end of armature $n'$, being attracted by the magnet $f$, strikes against the shoulders of the spindle or movable contact $l$, thereby intermittently opening and closing the circuit at the sparking-contacts, these sparking-contacts being placed as usual, so that the gas will be thrown upon them and hence ignited. This intermittent action of the contacts continues as long as the circuit remains closed. Hence in order that there may be no failure in igniting the gas I have adapted the circuit-closing device of the clock, so that the current will continue to flow through the sparking-contacts preferably for a minute and a half. The armature $n'$ is first drawn downward against the resistance of the retractile vibratory spring $n^2$, as shown in Fig. 8, carrying with it the pawl $o'$, thereby rotating the ratchet and valve one step, and afterward continuing its downward movement it strikes against the shoulders of spindle $l$, thereby producing an intermittent or vibratory action at the sparking-contacts. If an ordinary electro-magnet were employed, there would be no sparking at the electrodes $k$ $l$; but by forming the core of the electro-magnet of iron rods $m'$ and the central portion or tube $m$ a peculiar dynamic action is produced as between the vibrating armature and the core thus formed, this peculiar dynamic action resulting in inducing current in the circuit of the coil of the magnet, which induced current is added to or superimposed upon the battery-current which already exists therein. Thus the magnetism which is produced in the core by the intermittent action of the armature is transferred into current of higher tension than has been heretofore obtained by means of any magnet or motor capable of operating a valve in a gas-lighting apparatus. Thus an intense energy and impetus is given to the current, the effect of which is to extend and magnify the volume of sparks created at the sparking-contacts.

I prefer to use the electro-magnet and spark-coil as a part of one mechanism, as described; but my experiments have demonstrated that an ordinary electro-magnet may be used as a motor when a separate spark-coil is included in the circuit, the spark-coil being provided with a core consisting of a central bar of iron surrounded by an annular space filled with soft-iron rods. Such a construction I have illustrated in Fig. 15. Thus the electro-magnet $p'$ is provided with an ordinary core and a special spark-coil is placed in the circuit. This spark-coil is provided with the central bar $p^2$, which is surrounded by the rods $p^3$, placed within the coil $p^4$. A small spark-coil—say one and a quarter inches long and one inch in diameter—constructed after this manner will produce the desired effect.

I will now describe the time-controlled circuit-closing device or clock-work as illustrated in Figs. 11 and 12. Any ordinary clock-movement may be used as a motor, and therefore I will not describe the clock-train further than to say that the wheel $q$ may be considered as the hour-wheel—that is, as completing a revolution in twelve hours. This wheel $q$ is geared with the wheel or dial $q'$, so as to rotate the same once to every two revolutions of the hour-wheel $q$. Thus the wheel or dial $q'$ may be driven a complete revolution once in twenty-four hours and in the direction indicated by the arrow. The wire $d$ passes from the contact under the switch $b$ to the binding-post $q^2$ and thence to the contact-spring $q^3$. Now whenever this contact-spring is closed upon either of the adjustable contact-arms $q^4$ $q^5$ the circuit is completed and will remain closed until the dial in its movement, carrying with it the arm which may be in contact with spring $q^3$, has carried the said arm out of contact with said spring. It will be observed that the periphery of the dial $q'$ is notched, and that each of the arms $q^4$ $q^5$ is provided with a hook or detent adapted to engage with these peripheral notches. I have shown forty-eight such notches, dividing the dial into half-hours. It is evident that any desired number of notches might be provided—as, for example, ninety-six. It should be observed that near the end of each arm is provided a projecting metallic piece. Thus, as shown more clearly in Fig. 12, the projecting piece $q^6$ is provided upon the arm $q^4$. This piece $q^6$ furnishes a knife-edge, which is carried under the end of the contact-spring $q^3$ by the rotary movement of the disk. A piece of insulating material $q^7$ is provided preferably upon the under side of said contact-spring, so that for a time this contact-spring will rest with its insulated surface riding upon the said knife-edge.

The principal object of providing this insulated piece upon the spring so that it may ride upon the knife-edge is to cause the circuit to be closed at a particular moment. As the dial continues to move after the contact $q^6$ thereof has come against the insulated piece $q^7$, carried upon spring $q^3$, the said spring will be gradually lifted until the contact has passed off from the insulated piece $q^7$. During this time the backlash of the train will be taken up so that the electrical contact will be formed at the desired moment. The insulation, however, does not project quite so far toward the knife-edge as the spring, and hence when the insulation has passed over the spring the projecting end of the spring comes against the knife-edge, and at the desired moment the circuit of wire $d$ is thus completed. The length of the projecting end of the spring $q^3$ will determine the time during which the circuit will remain closed at the clock. As shown, it is intended to hold the circuit closed for a minute and a half.

I have shown the dial divided into spaces marked 24, 23, 22, &c. These arms $q^4$ $q^5$ are capable of being set at any suitable distance apart, and it is the time during which it takes the dial to traverse the distance between the arms so adjusted that determines the time during which gas will remain lighted. Suppose, for example, that the gas is turned off and the dial to be moving. As soon as contact is made between the projecting end of the spring $q^3$ and the knife-edge or other contact $q^6$ the circuit will be closed, and the valve being turned one step will be opened, throwing the gas against the sparks which will be formed. The dial, however, will keep on turning and shortly interrupt the circuit, but without again operating the ratchet. When, however, the dial in its revolution shall have brought the contact or knife-edge of arm $q^5$ into contact with the spring $q^3$, the circuit will be again closed and the valve being turned another step will shut off the gas. It is evident that any desired number of arms $q^4$ $q^5$ may be used upon the same dial. Moreover, my invention may be utilized for other purposes than street gas-lighting. I have found it especially useful for illuminating show-windows, in order that the gas may be turned off automatically, say at twelve o'clock at night.

It is evident that my invention may be embodied in various forms of mechanism without departing from my invention. For example, the dial may be made in the form shown in Figs. 13 and 14, in which a peripheral ring $r$ is secured to the arm of the wheel carrying the same, as shown. Upon this ring $r$ may be mounted any desired number of circuit-closing devices adapted to come one after another into contact with the circuit-closing spring $q^3$. These circuit-closing devices carried upon the dial are made adjustable, and are preferably so constructed that any one or more may be turned upon its pivot, so as to be out of the path of the projecting end of the contact-arm $q^3$ when passing under the same. Thus, as shown in Fig. 13, the contact-piece $r'$ is shown against its upper stop $r^2$. By turning this contact-piece $r'$ down against its other stop $r^3$ it will be carried out of the path of said contact-spring $r'$.

Instead of the annealed rods placed parallel with the central bar or tube of the core, I have in some instances used disks of soft iron insulated from one another, preferably by paper, as shown in Fig. 16. In this manner the desired result is accomplished, and for some reasons this disk form of the core would be preferred.

My invention admits of various other modifications that would readily suggest themselves to those skilled in the art, and I therefore do not limit myself to the details of construction shown.

Having thus described my invention, I claim as new and desire to secure by Letters Patent—

1. An electro-magnet coil, in combination with its core, consisting of a soft-iron tube and soft-iron rods placed in an annular space around the tube within the spool, the armature of said electro-magnet and sparking-contacts, against which the gas admitted through the core is adapted to be thrown, whereby the sparks are produced, while at the same time the magnet-armature is held by the attractive force of the electro-magnet, substantially as and for the purpose specified.

2. The combination, with the gas-burner, of an electro-magnetic device secured to the gas-pipe below the gas-tip, said electro-magnetic device being provided with a core consisting of a tube through which the gas passes and soft-iron rods in an annular space around said tube within the spool or coil, the pivoted armature of said electro-magnetic device being provided with a spring secured to the free end thereof at one end, the other end of said spring resting upon the end or insulated surface of the spool, and the movable contact or spindle $l$ of the sparking-contacts adapted to be set in vibration by the action of the armature while the spring is held compressed, substantially as and for the purpose specified.

3. The combination, with the armature and its underlying spring, of the spindle $l$, the spring $l'$ upon the spindle and the opposing contact $k$, said spindle being normally held by said spring $l'$ against its opposing contact $k$, said armature being provided with a slot through which the said spindle passes, said spindle being provided with a stop against which the armature is brought when fully attracted to hold its said underlying spring compressed, whereby the armature when attracted to compress its opposing spring is brought against the stop upon the spindle, thereby moving the spindle against the force of the spring, tending to hold the same against its opposing contact and thereby interrupting the circuit through the coil of the electro-magnet at the said sparking-contacts included in said circuit, substantially as and for the purpose specified.

4. The combination of the spark-creating circuit-breaker and the electro-magnet having its armature connected with a ratchet-wheel for rotating the same to turn on and off the gas, the core of said electro-magnet consisting in part of small iron rods, whereby the electro-magnet may be utilized as a spark-coil.

5. The armature of the electro-magnet provided with a central opening through which passes the tube carrying the gas, the retractile spring of said armature being attached to the under side of the free end thereof and the curved or lower beveled end of said spring bearing upon the upper end of the magnet-spool, said armature centrally at its free end being provided with a slot, in combination with the spindle forming one of the sparking-electrodes placed in said slot and operated by the movement of the armature as the current is broken intermittently at said electrodes or sparking-contacts, substantially as and for the purpose specified.

6. The combination, with the gas-valve provided with a ratchet-wheel and a pawl, of the armature with which said pawl is connected for rotating the same, said pawl being extended by a beak or projection, so as to come against the shaft of the valve to limit the movement thereof, substantially as and for the purpose specified.

7. An electro-magnet having an annular chamber within the coil, this chamber being provided with annealed or soft-iron rods to form the core or a portion thereof, whereby the electro-magnet is made more efficient and adapted to serve also as a spark-coil, substantially as and for the purpose specified.

8. The adjustable time-operated circuit-closer and the flexible spring having its underlying insulation and projecting curved end adapted to intercept the said adjustable time-operated circuit-closer for taking up the backlash of the clock-gearing and for forming the scraping-contact for closing the circuit, combined with the electro-magnet and spark-coil, and the hand-switch whereby the gas may be ignited or extinguished at any predetermined hour, as indicated by the adjustable arms, or independently by means of the hand-switch, as may be desired, substantially as and for the purpose specified.

9. The dial and attached pinion driven by clock-work, its peripheral notches, radial circuit-closing arms provided with projecting lugs and springs for engaging the notches, in combination with the spring for forming contact with the circuit extending to the electro-magnet, the said electro-magnet and the gas-valve controlled by said electro-magnet and the armature of said electro-magnet, and the sparking-contacts operated by the intermittent movement of the armature after the valve has been opened, whereby the lighting of the gas thrown against the sparking-contacts is assured, substantially as and for the purpose specified.

10. The combination, with the time-operated dial-contact, of the contact-spring provided with the insulated piece against which the said contact is first brought, whereby the backlash is taken up and the contact formed at the desired moment, substantially as and for the purpose specified.

11. The combination, with the retaining-spring, of the gas-valve provided with the ratchet-wheel against which the spring presses, said spring being pivoted and adapted to be swung away from the end of said valve, and an armature upon which the pawl is carried, said pawl being adapted to be lifted over the shaft of the valve, substantially as and for the purpose specified.

12. The combination, in an electric gas-lighting mechanism, of the armature $n'$, provided with a slot, the spindle forming one of the sparking-electrodes passing through said slot and enlarged at its lower end, the portion of the spindle passing through said slot being flattened to prevent the same from turning within the slot, the spring $l'$ upon the spindle, and the underlying spring $n^2$, substantially as and for the purpose specified.

13. In a gas-lighting apparatus, the binding-post $e$, consisting of a sheared segment on a metallic piece of the electro-magnet, said binding-post provided with a screw and washer insulated and adapted to receive the wires from the electro-magnet and battery, substantially as described.

14. The combination, with the gas-tip, of the clamp or ring $g$, insulated by the paper washer $h$, said ring being provided with the fixed contact $k$ and movable electrode $l$, with means for vibrating the same, substantially as described.

In witness whereof I hereunto subscribe my name this 26th day of December, A. D. 1890.

GEORGE D. CLARKE.

Witnesses:
   ELLA EDLER,
   GEORGE P. BARTON.